United States Patent
Ng

(10) Patent No.: US 11,602,150 B2
(45) Date of Patent: Mar. 14, 2023

(54) TORTILLA CONVEYOR TRANSFER SYSTEM

(71) Applicant: Grupo Bimbo S.A.B. DE C.V., Mexico City (MX)

(72) Inventor: Tommy Ng, Etobicoke (CA)

(73) Assignee: GRUPO BIMBO S.A.B. de C.V., Mexico City (MX)

( * ) Notice: Subject to any disclaimer, the term of this patent is extended or adjusted under 35 U.S.C. 154(b) by 860 days.

(21) Appl. No.: 16/480,993

(22) PCT Filed: Jan. 31, 2017

(86) PCT No.: PCT/IB2017/050498
§ 371 (c)(1),
(2) Date: Jul. 25, 2019

(87) PCT Pub. No.: WO2018/142180
PCT Pub. Date: Aug. 9, 2018

(65) Prior Publication Data
US 2020/0000102 A1    Jan. 2, 2020

(51) Int. Cl.
*B65G 43/08* (2006.01)
*A21B 1/48* (2006.01)
(Continued)

(52) U.S. Cl.
CPC ............... *A21B 1/48* (2013.01); *A21B 3/07* (2013.01); *A21B 5/03* (2013.01); *B65G 43/08* (2013.01);
(Continued)

(58) Field of Classification Search
CPC combination set(s) only.
See application file for complete search history.

(56) References Cited

U.S. PATENT DOCUMENTS

| D811,782 S | * | 3/2018 | Rodriguez | ............... D6/675.2 |
| 2004/0241267 A1 | * | 12/2004 | Schultz | ............... A21C 11/006 425/193 |

(Continued)

FOREIGN PATENT DOCUMENTS

| EP | 3 081 513 A1 | 10/2016 |
| JP | 2007060936 A | 3/2007 |

(Continued)

OTHER PUBLICATIONS

Written Opinion of the International Searching Authority.

*Primary Examiner* — Kyle O Logan
(74) *Attorney, Agent, or Firm* — Crowell & Moring LLP; John C. Freeman

(57) ABSTRACT

A tortilla conveyor transfer system is configured to transfer product from a tortilla press to an oven. The tortilla press outputs batches of product to a press conveyor driven at a press speed. The oven then receives the batches of product at an oven conveyor driven at an oven speed that is slower than the press speed. The tortilla conveyor transfer system is interposed between the press conveyor and the oven conveyor. The tortilla conveyor transfer system has a first conveyor, a second conveyor, and a controller. The first conveyor is positioned in series with the press conveyor and the second conveyor, and the second conveyor is positioned in series with the first conveyor and the oven conveyor. In operation, the controller controls and varies the speed of the first conveyor and the second conveyor.

26 Claims, 5 Drawing Sheets

(51) Int. Cl.
*A21B 3/07* (2006.01)
*A21B 5/03* (2006.01)
*B65G 43/10* (2006.01)

(52) U.S. Cl.
CPC ...... *B65G 43/10* (2013.01); *B65G 2201/0202* (2013.01)

(56) References Cited

U.S. PATENT DOCUMENTS

2008/0082206 A1* 4/2008 Egami ................... B65G 43/10
    700/230
2016/0297618 A1* 10/2016 Beesley ................. B65G 43/10
2021/0362194 A1* 11/2021 Lundahl .................. B07C 3/08

FOREIGN PATENT DOCUMENTS

JP          2015231331 A   12/2015
WO   WO 2008/042294 A2   4/2008

* cited by examiner

TORTILLA CONVEYOR TRANSFER SYSTEM

RELATED APPLICATIONS

This application claims priority to PCT Application No. PCT/IB2017/050498 filed on Jan. 31, 2017, the entire contents of which are incorporated herein by reference in their entirety.

FIELD

This disclosure relates generally to tortilla conveyor transfers systems, and particularly to a multi-conveyor system for transferring product from a tortilla press to an oven.

BACKGROUND

Conveyor transfer systems transport batches of product between various stations in a production facility. Generally, each station implements a different stage of production. For example, to produce food products such as flat breads, tortillas, and pizzas, a conveyor system will generally transfer the food product from a press, which flattens the dough which forms the product to an oven for heating.

However, the press and oven may operate without coordination between one another. In particular, a press, such as a tortilla press, will output tortillas intermittently in batches; as some time is needed to press each batch of tortillas. However, once a batch of tortillas is output from the press, the conveyor system may transfer the batch to the oven at a relatively rapid pace. On the other hand, the oven generally heats product at a continuous but relatively slow pace.

Accordingly, there remains a need for improved systems, methods, and devices for transferring product from a tortilla press to an oven during production.

SUMMARY

In one aspect, there is provided a tortilla conveyor transfer system configured to transfer product from a tortilla press to an oven, the tortilla press outputting batches of product to a press conveyor driven at a press speed, and the oven receiving the batches of product at an oven conveyor driven at an oven speed, the oven speed being slower than the press speed, the tortilla conveyor transfer system comprising a first variable speed conveyor positioned in series with the press conveyor; a second variable speed conveyor positioned in series with the first variable speed conveyor and the oven conveyor; and a controller communicatively coupled to the first variable speed conveyor and to the second variable speed conveyor, and configured to while the press conveyor is at the press speed, operate the first variable speed conveyor at the press speed, thereby transferring a batch of product from the press conveyor to the first variable speed conveyor; operate the second variable speed conveyor at an intermediate speed, the intermediate speed being faster than the oven speed and slower than the press speed; once the batch of product has completely transferred from the press conveyor to the first variable speed conveyor, reduce the speed of the first variable speed conveyor to the intermediate speed; and reduce the speed of the first variable speed conveyor to the oven speed and reduce the speed of the second variable speed conveyor to the oven speed, to transfer the batch of product from the first variable speed conveyor to the second variable speed conveyor, and then from the second variable speed conveyor to the oven conveyor.

In another aspect, there is provided a method for transferring product from a tortilla press to an oven, the tortilla press outputting batches of product to a press conveyor driven at a press speed, and the oven receiving the batches of product at an oven conveyor driven at an oven speed, the oven speed being slower than the press speed, the method comprising: while the press conveyor is at the press speed, operating a first variable speed conveyor positioned in series with the press conveyor at the press speed, thereby transferring a batch of product from the press conveyor to the first variable speed conveyor; operating a second variable speed conveyor positioned in series with the first variable speed conveyor and the oven conveyor at an intermediate speed, the intermediate speed being faster than the oven speed and slower than the press speed; once the batch of product has completely transferred from the press conveyor to the first variable speed conveyor, reducing the speed of the first variable speed conveyor to the intermediate speed; and reducing the speed of the first variable speed conveyor to the oven speed and reducing the speed of the second variable speed conveyor to the oven speed, to transfer the batch of product from the first variable speed conveyor to the second variable speed conveyor, and then from the second variable speed conveyor to the oven conveyor.

Other features will become apparent from the drawings in conjunction with the following description.

BRIEF DESCRIPTION OF THE DRAWINGS

In the figures which illustrate example embodiments.

DETAILED DESCRIPTION

Disclosed are systems, methods, and devices for transferring batches of tortilla product using a tortilla conveyor transfer system from a tortilla press to an oven. Such systems, methods, and devices may also be suited for the production of flat breads, pizzas, and other similar dough products. The tortilla press outputs batches of product to a press conveyor driven at a press speed. The oven receives the batches of product at an oven conveyor driven at an oven speed that is slower than the press speed. The tortilla conveyor transfer system is interposed between the press conveyor and the oven conveyor and is configured to transfer product from the tortilla press to the oven.

The tortilla conveyor transfer system has a first conveyor which can be driven at variable speeds, a second conveyor which can be driven at variable speeds, and a controller to control the speed of each of the first conveyor and the second conveyor. The first conveyor is positioned in series with the press conveyor and the second conveyor, and the second conveyor is positioned in series with the first conveyor and the oven conveyor. In operation, the controller varies the speed of the first conveyor and the second conveyor such that the oven conveyor receives a semi-steady stream of batches of food product from the press. In some embodiments, the speed of the first conveyor and the second conveyor may also be controlled to minimize gaps between different batches received at the oven conveyor, thereby increasing the efficiency of the oven and the overall efficiency of the line.

Figure 1:
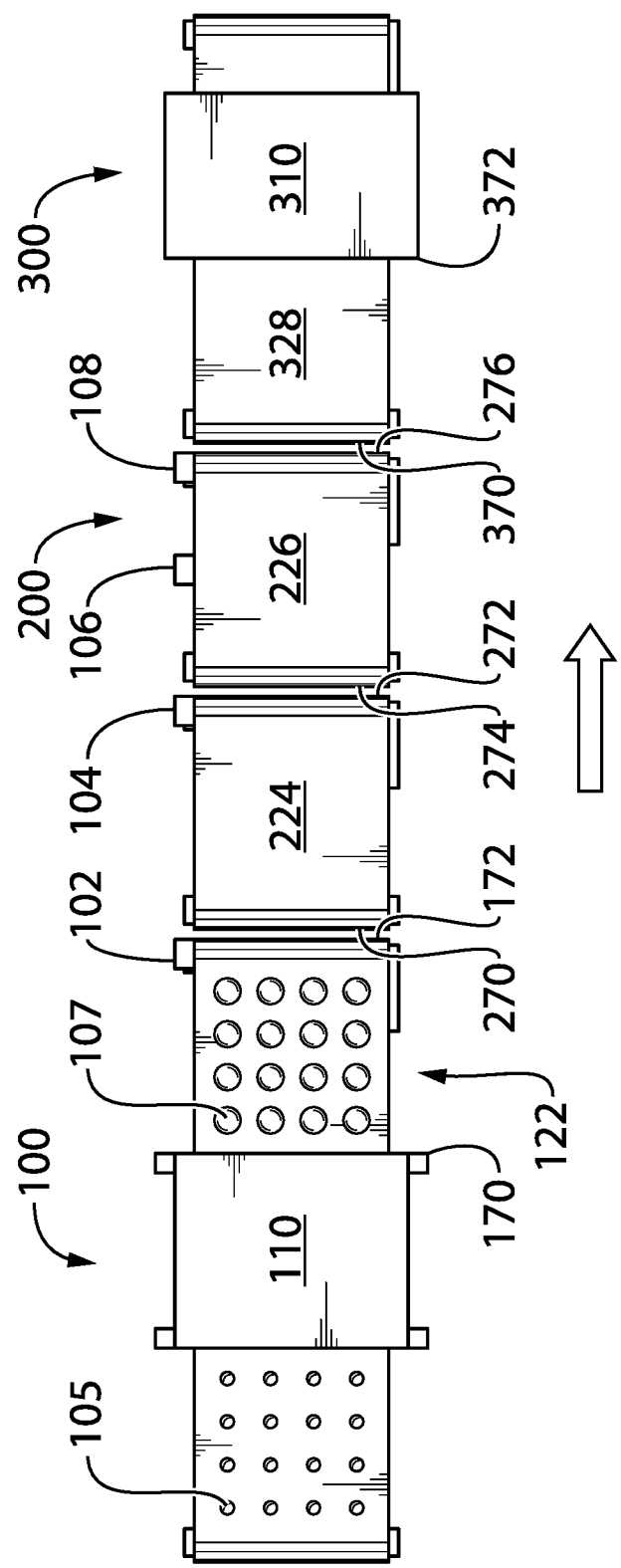
FIG. 1 illustrates a top plan view of an example embodiment of a conveyor transfer system.
Figure 2:
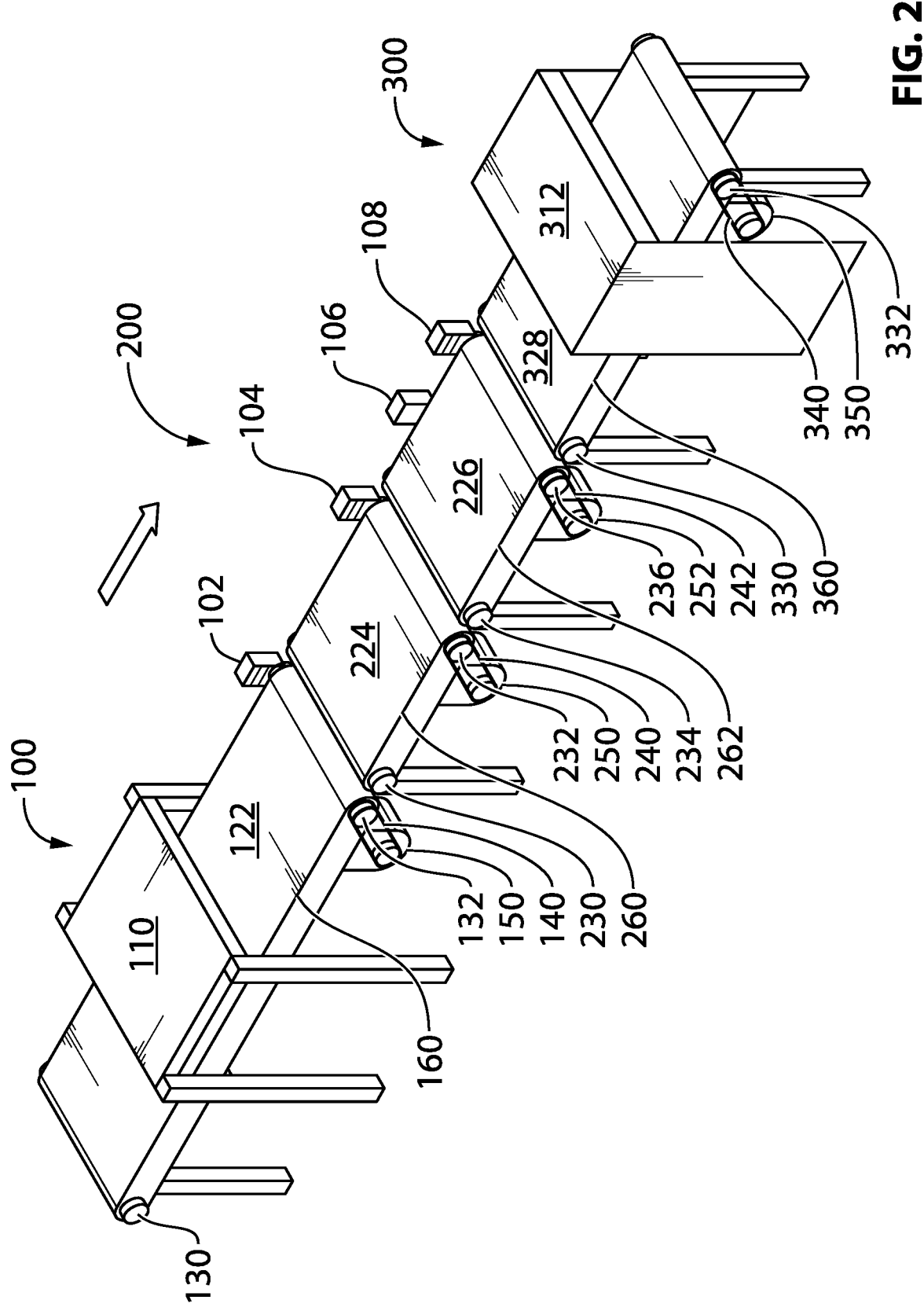
FIG. 2 illustrates a perspective view of an example embodiment of the conveyor transfer system of FIG. 1.

FIG. 1 illustrates a top plan view of an example embodiment of conveyor transfer system 200, having first conveyor 224 and second conveyor 226, interposed between a press 100 and an oven 300. FIG. 2 illustrates a perspective view of the same. As shown in FIG. 2, each of press 100, conveyor transfer system 200, and oven 300 is mounted on support frames at a suitable height.

Press 100 is configured to press balls of dough 105 into tortillas, thereby flattening and expanding the dough in preparation for heating in oven 300. As shown in FIG. 1, a batch of twelve pressed balls of dough 107 is ready for heating, arranged proximate to one another in rows.

Each batch of the same system will generally consist of the same number of balls of dough arranged in a similar arrangement. Nonetheless, the number and arrangement of the balls of dough may be varied in other systems.

Press 100 includes an upper platen 110 mounted on a support frame (FIG. 2). Upper platen 110 is configured to move vertically (up and down) to press a batch of balls of dough 105 against a lower platen (not shown). Upper platen 110 thus operates in cycles. In each cycle, upper platen 110 is initially raised to transfer away a flattened batch of pressed balls of dough 107 and to introduce a new batch of balls of dough 105. Next, in each cycle, upper platen 110 is lowered to flatten the balls of dough. To enable movement of upper platen 110, the upper platen is typically connected to an actuator, a motor, or other similar mechanism.

Figure 3:
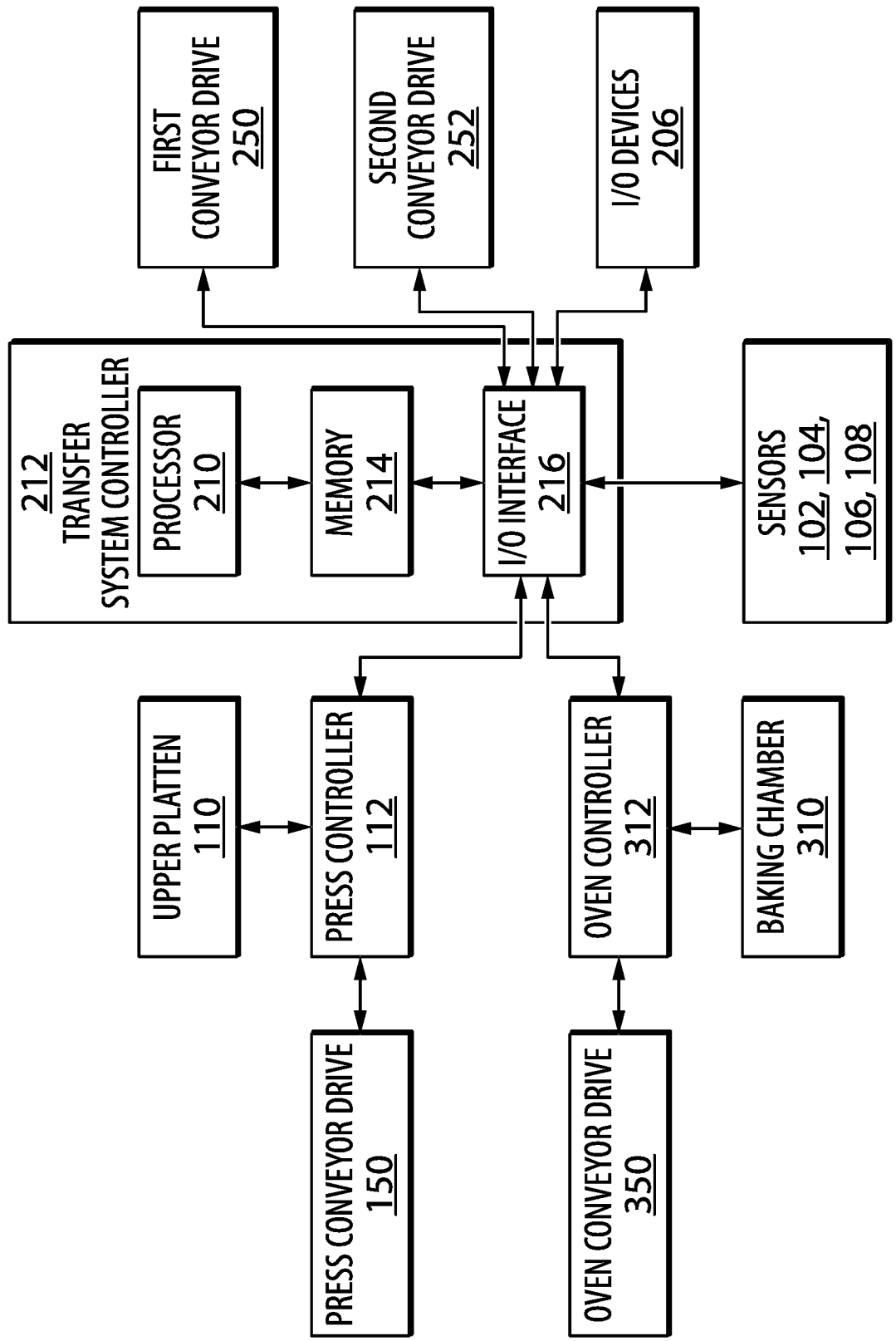
FIG. 3 is a high-level block diagram of an example transfer system controller for controlling the conveyor transfer system of FIG. 1.

Press 100 also includes a press conveyor 122. Press conveyor 122 has an infeed end 170 for receiving products and a trailing end 172 for outputting pressed tortillas. Upper platen 110 is positioned adjacent to infeed end 170 such that press conveyor 122 can transport batches of tortillas after being pressed. Press conveyor 122 may be constructed using known techniques. As shown in FIG. 2, press conveyor 122 has an endless belt 160, which is made of a suitable material for handling tortillas (for example, non-adhering and non-toxic food safe material). Further, endless belt 160 rotates about a set of rollers at each end 130, 132. To drive press conveyor 122, a drive belt 140 is used to connect one set of rollers (e.g. rollers 132 or rollers 130) to a drive motor 150. The speed of drive motor 150, and thus the speed of press conveyor 122, may be variable and controllable by a controller, such as press controller 112 (FIG. 3). Generally, however, press 100 is driven at a substantially constant speed during operation, referred to as the press speed. In some embodiments, the press speed is generally selected as the fastest operable speed of the press conveyor (i.e. a speed at which the tortillas on the drive belt of the press conveyor do not slip nor overlap); thereby, minimizing the duration of each press cycle. In one example, the press speed is set to 54 inches per second.

In one embodiment, press conveyor 122 is mounted on a support frame consisting of four or more rigid legs, and upper platen 110 is attached to a U-shaped support frame, which allows endless belt 160 of press conveyor 122 to pass underneath. In another embodiment, upper platen 110 is connected to four or more shafts that move upper platen 110 vertically above endless belt 160.

In one embodiment, the length of each batch is approximately 40 inches (i.e. from infeed end 170 to trailing end trailing end 172). Accordingly, the length of upper platen 110 and the length of press conveyor 122 are similar to the length of each batch from infeed end 170 to trailing end trailing end 172.

Oven 300 includes a baking chamber 310 and an oven conveyor 328. Oven conveyor 328 has an infeed end 370 for receiving products and a midsection 372 at which baking chamber 310 begins. Baking chamber 310 includes heating elements (e.g. electric or natural gas elements) and is maintained at a baking temperature during operation (i.e. a given temperature in the range of 300 to 450° F.). As shown, oven conveyor 328 is configured to transport product into baking chamber 310 during operation for baking; however, in other embodiments, the product will be transferred to yet another conveyor. In one example, the length of oven conveyor from infeed end 370 to midsection 372 is 19 inches.

Oven conveyor 328 is also constructed using known techniques. As shown in FIG. 2, oven conveyor 328 has an endless belt 360, which is made of a suitable material for handling tortillas (for example, heat-resistant, non-adhering, and non-toxic food safe material). Further, endless belt 360 rotates about a set of rollers at each end 330, 332. To drive oven conveyor 328, a drive belt 340 is used to connect one set of rollers (e.g. rollers 332 or rollers 330) to a drive motor 350. The speed of drive motor, and thus the speed of oven conveyor 328, may be variable and controllable by a controller, such as oven controller 312 (FIG. 3). Generally, however, oven 300 is driven at a substantially constant speed during operation, referred to as the oven speed.

Conveyor transfer system 200 includes a first conveyor 224 and a second conveyor 226. Each of the first and second conveyors 224, 226 may be driven at variable speeds. Further, each of the first and second conveyors 224, 226 has an infeed end 270, 274 for receiving products and a trailing end 272, 276 for outputting products.

First conveyor 224 is positioned in series with press conveyor 122. In other words, infeed end 270 of first conveyor 224 is positioned adjacent to trailing end 172 of press conveyor 122 such that infeed end 270 can receive products from trailing end 172. In some embodiments, a set of rollers is disposed between infeed end 270 and trailing end 172 to ensure that products are transferred without falling between the two conveyors.

First conveyor 224 is also positioned in series with second conveyor 226 and second conveyor 226 is positioned in series with first conveyor 224. In other words, infeed end 274 of second conveyor 226 is positioned adjacent to trailing end 272 of first conveyor 224 such that infeed end 274 can receive products from trailing end 272. In some embodiments, a set of rollers is disposed between infeed end 274 and trailing end 272 to ensure that products are transferred without falling between the two conveyors.

Second conveyor 226 is also positioned in series with oven conveyor 328; i.e. infeed end 370 of oven conveyor 328 is positioned adjacent to trailing end 276 of second conveyor 226 such that infeed end 370 can receive products from trailing end 276. In some embodiments, a set of rollers is disposed between infeed end 370 and trailing end 276 to ensure that products are transferred without falling between the two conveyors.

Accordingly, a batch of products is placed first on press conveyor 122 and transferred along conveyor transfer system 200 to oven conveyor 328 and into a first end of baking chamber 310. Once baking is complete, each product is outputted at a second end of baking chamber 310, the second end opposing the first end. In particular, as shown in FIGS. 1 and 2, the batch of tortillas is transferred from below upper platen 110 to trailing edge 172 of press conveyor 122. The batch is then transferred along infeed end 270 of first conveyor 224 to trailing end 272, and further along infeed end 274 of second conveyor 226 to trailing end 276. Finally, the batch is transferred along infeed end 370 of oven conveyor 328 to midsection 372, into baking chamber 310, and then exits baking chamber 310.

First conveyor 224 may be constructed using known techniques. As shown in FIG. 2, first conveyor 224 has an endless belt 260, which is made of a suitable material for handling tortillas (for example, non-adhering and non-toxic food safe material). Further, endless belt 260 rotates about a set of rollers at each end 230, 232. To drive first conveyor 224, a drive belt 240 is used to connect one set of rollers (e.g. rollers 232) to a drive motor 250. The speed of drive motor, and thus the speed of first conveyor 224, is variable and controllable by a controller, such as transfer system controller 212 (FIG. 3). In one example, the length of first conveyor 224 is 54 inches (i.e. from infeed end 270 to trailing end 272).

Second conveyor 226 may also be constructed using known techniques. As shown in FIG. 2, second conveyor 226 has an endless belt 262, which is made of a suitable material for handling tortillas (for example, non-adhering and non-toxic food safe material). Further, endless belt 262 rotates about a set of rollers at each end 234, 236. To drive first conveyor 224, a drive belt 242 is used to connect one set of rollers (e.g. rollers 236) to a drive motor 252. The speed of drive motor, and thus the speed of second conveyor 226, is variable and controllable by a controller, such as transfer system controller 212 (FIG. 3). In one example, the length of second conveyor 226 is 19 inches (i.e. from infeed end 274 to trailing end 276).

Conveyor transfer system 200 may optionally include sensors 102, 104, 106, 108 positioned at pre-determined positions along conveyor transfer system 200. As shown in FIG. 2, each sensor of sensors 102, 104, 106, 108, is mounted on a support frame and suitably positioned to measure and determine any of the presence and speed of batches of food products along conveyor transfer system 200. Sensors 102, 104, 106, 108 may be implemented using any of a wide variety of sensors suitable to detect the presence of food products, and in some embodiments, to determine their speed. Suitable sensors include, without limitation, infrared presence sensors, ultrasonic sensors, microwave sensors, and camera sensors. The specific choice of sensor may be dictated by the application and the type of product being transported along conveyor transfer system 200.

Sensors 102, 104, 106, 108 may communicate with transfer system controller 212 to enable the controller to manage the transfer of each batch of tortillas based on the position of the batch in real-time (or near real-time). In some embodiments, however, no sensors are included in conveyor transfer system 200. In such embodiments, transfer system controller 212 may manage the transfer of each batch of tortillas based on the expected position of the batch. Since the system operates in cycles, the position of the batch may be predicted with relative accuracy based on past behavior. Accordingly, controller 212 may rely on a series of countdown timers to determine the expected position of the batch along conveyor transfer system 200. Each timer may be programmed in memory 214.

As shown in FIGS. 1-2, sensor 102 is positioned at trailing end 172 of press conveyor 122, and is configured to detect whether the batch of product has completely transferred from press conveyor 122 to the first conveyor 224, and whether a batch of product is loaded onto press conveyor 122. Sensor 104 is positioned at trailing end 272 of first conveyor 224, and is configured to detect whether the batch of product has completely transferred from the first conveyor 224 to the second conveyor 226. Sensor 108 is positioned at trailing end 276 of second conveyor 226, and is configured to detect whether the batch of product has completely transferred from the second conveyor 226 to the oven conveyor 328.

Sensor 106 is positioned at a pre-determined location approximately at a half-way point between infeed end 274 and trailing end 276 of second conveyor 226, and is configured to detect whether batch of product has reached the pre-determined location. As will be explained in greater detail, the pre-determined location and the position of sensor 106 is strategically selected such that batch 504 (FIG. 5) travels at the oven speed when it reaches trailing end 276 of second conveyor 226, whilst taking into account the time needed to deaccelerate second conveyor 226 to the oven speed.

FIG. 3 is a high-level block diagram of an example conveyor transfer system controller 212 for controlling conveyor transfer system 200. As shown in FIG. 3, controller 212 includes processor 210, memory 214, and I/O interface 216. Processor 210 is configured to execute computer-readable instructions stored in memory 214. Controller 212 may be implemented using a programmable logic controller (PLC) or, alternatively, using a microcontroller-based design. Controller 212 will, in some embodiments, be optimized for extreme conditions that are common in a factory environment (i.e. able to withstand moisture, heat, and cold).

I/O interface 216 enables communications between transfer system controller 212 and other system components. Such other system components will implement compatible communication interfaces to enable such communication. I/O interface 216 may be configured for both wired (e.g. serial communication using RS-232 or other protocols) and wireless communication (e.g. Industrial Wireless LAN, ZigBee®, or other protocols). Further, I/O interface 216 may be configured for both digital-to-digital communication and digital-to-analogue communication. Accordingly, I/O interface 216 may include a digital-to-analogue converter (DAC) and an analogue-to-digital converter (ADC) to interface with analogue sensors, motors, and the like. In one example, I/O interface 216 is configured to output pulse wave modulation (PWM) control signals to control first conveyor drive 250 and second conveyor drive 252.

Transfer system controller 212 is thus communicatively coupled, via I/O interface 216, with first conveyor drive 250 of first conveyor 224 and second conveyor drive 252 of second conveyor 226. Controller 212 can thus control and monitor the speed of each conveyor. For example, controller 212 may set an operational speed of each of first conveyor 224 and second conveyor 226 and then monitor the speed of each conveyor and/or conveyor drive to ensure that each conveyor maintains the desired speed.

Controller 212 is also configured to communicate, via I/O interface 216, with sensors 102, 104, 106, 108 to determine any of the presence and speed of batches of food products along conveyor transfer system 200. As previously discussed, suitable sensors include, without limitation, infrared presence sensors, ultrasonic sensors, microwave sensors, and camera sensors. Each sensor is configured to send measurements to controller 212, via I/O interface 216, at regular intervals (e.g. every 0.1 seconds, or every 0.01 seconds). The most suitable interval for each sensor will vary based on the configuration.

Controller 212 is also configured to communicate with I/O device 206 to permit operators to monitor and control the operation of conveyor transfer system 200. Different I/O devices 206 will be suitable for each configuration, but generally include displays, touch screens, operation buttons (e.g. START, STOP, etc.), keyboards, computer mousses, and so forth.

Transfer system controller 212 may also configured to communicate, via I/O interface 216, with press controller 112 and oven controller 312. Press controller 112 and oven controller 312 may be implemented in a manner similar to transfer system controller 212.

Press controller 112 controls the operation of press 100. Press controller 112 is configured to communicate with upper platen 110 to control the pressing of balls of dough by upper platen 110. Further, press controller 112 is configured to communicate with press conveyor drive 150 to control the operation of press conveyor 122. For example, press controller 112 may stop press conveyor 122 while a new batch of dough is being pressed by upper platen 110, load the new batch onto press conveyor 122, and then transfer pressed dough from press conveyor 122 to first conveyor 122. During operation of press 100, press controller 112 maintains press conveyor 122 stationary (i.e. during pressing) or operates press conveyor 122 at the press speed (to transfer batches).

Oven controller 312 controls the operation of oven 300. Oven controller 312 is configured to communicate with baking chamber 310 to control the baking of pressed dough. This may include setting and monitoring the temperature of baking chamber 310 (i.e. monitoring using a temperature sensor). Further, oven controller 312 is configured to communicate with oven conveyor drive 350 to control the operation of oven conveyor 328. For example, oven controller 312 may set the speed of oven conveyor drive 350 and monitor the speed to ensure that oven conveyor drive 350 maintains a constant speed. During operation, oven controller 312 maintains oven conveyor 328 at a constant oven speed that is typically slower than the maximum press conveyor drive speed. The oven speed is selected based on the length of the oven, the baking temperature of the oven, and the time needed for each food product in the oven to ensure that the dough is cooked as desired. In one example, the oven speed is set to 20 inches per second.

Transfer system controller 212 can send instructions to any of press conveyor drive 150 and oven conveyor drive 350 via I/O interface 216, and further via the respective controller. Accordingly, controller 212 can indirectly control and monitor the speed and operation of press conveyor drive 150 and oven conveyor drive 350. In some embodiments, however, a single controller/processor is used to directly communicate and control the speed of each conveyor in the system.

Figure 4:
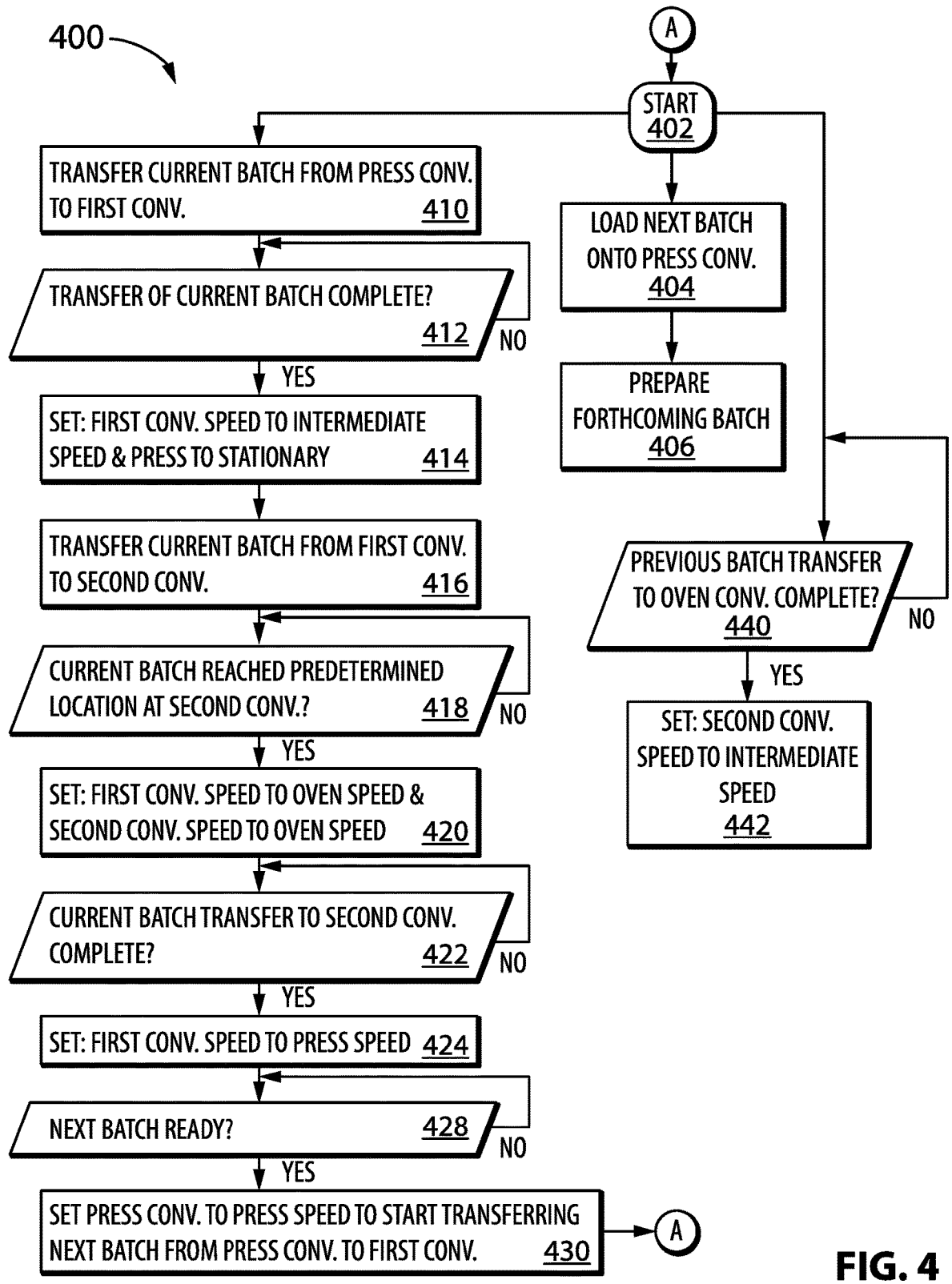
FIG. 4 is a flowchart depicting exemplary blocks an example method performed by the conveyor transfer system of FIG. 1.
Figure 5:
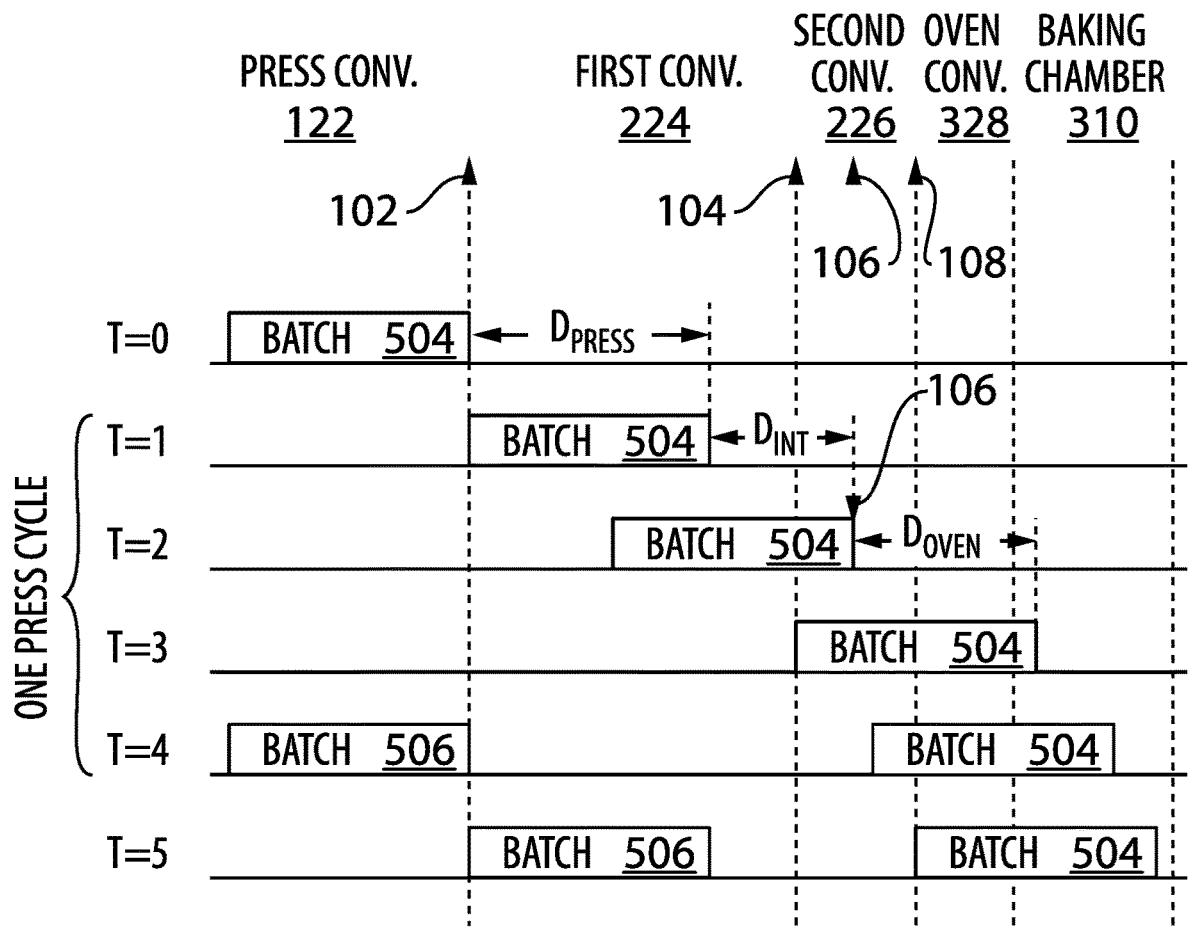
FIG. 5 is a high-level timing diagram depicting snapshots during the operation of the conveyor transfer system of FIG. 1.

Reference is now made to FIGS. 4-5. FIG. 4 is a flowchart depicting blocks an example method 400 for transferring product from press 100 to an oven 300 using conveyor transfer system 200. Computer-readable instructions implementing method 400 are stored in memory 214 for execution by processor 210. FIG. 5 is a high-level timing diagram depicting snapshots of a first batch of product 504 being transferred from press 100 to oven 300 using conveyor transfer system 200 in accordance with method 400 of FIG. 4. FIG. 5 illustrates the location of batch 504 at various points in time, relative to press conveyor 122, first conveyor 224, second conveyor 226, oven conveyor 328, and sensors 102, 104, 106, and 108.

Press 100, conveyor transfer system 200, and oven 300 are initialized at block 402 when processor 210 receives an initialization command from I/O devices 206, for example, from a START button. Upon receipt of the initialization command at block 402, transfer system controller 212 may initialize press 100, conveyor transfer system 200, and oven 300. In some embodiments, however, press 100 and oven 300 are initialized using a distinct initialization command.

During initialization, press 100 presses a first batch of balls of dough 105 (FIG. 1) to produce pressed balls of dough 107 (FIG. 1). At block 404, press 100 loads the pressed batch 107 onto press conveyor 122. As depicted in FIG. 5 at T=0, first batch 504 is loaded on press conveyor 122. At block 406, press 100 prepares a forthcoming batch by pressing another batch of balls of dough. As shown in FIG. 5, the preparation of forthcoming batch 506 is not complete until T=4. Accordingly, no batch is loaded onto press conveyor 122 during T=1, T=2, and T=3. During this period of time, press conveyer drive 150 and press conveyor 122 remain stationary. Press 100 operates in cycles, where the press cycle in this example is from T=0 to T=3.

Further, during initialization, processor 210 operates second conveyor 226 at intermediate speed that is faster than the oven speed and slower than the press speed. Processor 210 also initializes oven 300 by turning on oven conveyor 328 and setting the speed of oven conveyor 328 to oven speed. Processor 210 also sets the heating elements of baking chamber 310 to 'on' and waits until the temperature of baking chamber 310 reaches the desired backing temperature.

After first batch 504 is loaded onto press conveyor 122, press conveyor 122 remains stationary until processor 210 executes block 410 of method 400. At block 410, processor 210 sends a transfer signal to press controller 112 to initiate transfer of first batch 504 from press conveyor 122 to first conveyor 224. Upon receipt of the transfer signal, press controller 112 operates first conveyor 224 at the press speed while press conveyor 122 is at the press speed; thereby, transferring batch 504 from press conveyor 122 to first conveyor 224. As previously explained, processor 210 may adjust the speed of each conveyor by communicating with the corresponding drive. Accordingly, processor 210 synchronizes the speeds of the two conveyors to aid in a smooth transfer of batch 504 from press conveyor 122 to first conveyor 224.

At block 412, processor 210 determines whether current batch 504 has completely transferred from press conveyor 122 to first conveyor 224. To determine that the batch is completely transferred from press conveyor 122 to first conveyor 224, processor 210 may analyze signals received from sensor 102. Sensor 102 is positioned at trailing end 172 of press conveyor 122; thus, when the transfer of batch 504 from press conveyor 122 to first conveyor 224 is complete the signal from sensor 102 changes to indicate that no product is in proximity of the sensor. Thus, processor 210 is configured to determine whether current batch 504 has completely transferred from press conveyor 122 to first conveyor 224 based on an input from sensor 102.

Once processor 210 determines that current batch 504 has completely transferred from press conveyor 122 to first conveyor 224 (as shown in FIG. 5 at T=1 and T=5) method 400 proceeds to block 414. For example, shortly after processor 210 determines that current batch 504 has completely transferred, method 400 may proceed to block 414. Some delay may be expected based on the configuration, for example, due to a lag in communicating. In some embodiments, method 400 proceeds to block 414 in response to determining that current batch 504 has completely transferred from press conveyor 122 to first conveyor 224.

At block 414, processor 210 sets press conveyor 122 to remain stationary, as there is no product on press conveyor 122 (as shown in FIG. 5 at T=1, T=2, T=3, and T=5). Further, at block 414, processor 210 reduces the speed of first conveyor 224 to the intermediate speed; a speed that is slower than the press speed, but faster than the oven speed. Previously, first conveyor 224 was operating at press speed. By reducing the speed to the slower intermediate speed, a smoother transfer to second conveyor 226 is more likely. Further, by maintaining the intermediate speed, which is faster than the oven speed, less time is needed to transfer each batch to second conveyor 226.

Alternatively, the time needed to complete the transfer from press conveyor 122 to first conveyor 224 may be programmed into memory 214. Thus, to determine when a batch is expected to be completely transferred from press conveyor 122 to first conveyor 224, processor 210 may start a countdown timer based on the time needed to complete the transfer. Thus, processor 210 may be configured to reduce the speed of first conveyor 224 to the intermediate speed based on a countdown timer.

At block 416, conveyor transfer system 200 transfers batch 504 from first conveyor 224 to second conveyor 226. The speed of first conveyor 224 and second conveyor 226 is synchronized as both are operating at the intermediate speed during the transfer of batch 504 from first conveyor 224 to second conveyor 226.

During the transfer of batch 504 from first conveyor 224 to second conveyor 226, at block 418, processor 210 determines whether batch 504 has reached a pre-determined location (shown as the location of sensor 106) along second conveyor 226 by analyzing signals received from sensor 106. Thus, processor 210 is configured to determine whether batch 504 has reached a pre-determined location based on an input from sensor 106.

Once processor 210 determines that batch 504 reached the pre-determined location (as shown in FIG. 5 at T=2), processor 210 executes block 420. In some embodiments, method 400 proceeds to block 420 in response to determining that batch 504 reached the pre-determined location. At block 420, processor 210 reduces the speed of both first conveyor 224 and second conveyor 226 to the oven speed in anticipation of batch 504 reaching oven conveyor 328. Previously, both first conveyor 224 and second conveyor 226 were operating at the intermediate speed. Further, in some embodiments, processor 210 synchronously reduces the speeds of first conveyor 224 and second conveyor 226 during the deceleration from the intermediate speed to the oven speed, such that the two conveyors maintain substantially the same speed as one another during deceleration. This is helpful as batch 504 is expected to span (in length) both first conveyor 224 and second conveyor 226 during the transfer from first conveyor 224 to second conveyor 226 (as shown in FIG. 5 at T=2).

Alternatively, the time needed for batch 504 to reach the pre-determined location may be programmed into memory 214. Thus, to determine when a batch is expected reach the pre-determined location, processor 210 may start a countdown timer based on the time needed to complete the transfer. Thus, processor 210 may be configured to reduce the speed of both first conveyor 224 and second conveyor 226 to the oven speed based on a countdown timer.

The pre-determined location is strategically selected such that batch 504 travels at the oven speed when it reaches trailing end 276 of second conveyor 226. While processor 210 sets the speed of both first conveyor 224 and second conveyor 226 to the oven speed at block 420, the first conveyor 224 and second conveyor 226 will need some time to deaccelerate from the intermediate speed to the oven speed. Accordingly, the pre-determined location is selected to account for the deceleration time; and depends on the intermediate speed, the oven speed, and the time needed for second conveyor drive 252 to deaccelerate second conveyor 226 from the intermediate speed to the oven speed. In some embodiments, pre-determined location is positioned approximately at a half-way point between infeed end 274 and trailing end 276 of second conveyor 226. In some embodiments, sensor 106 is positioned at the pre-determined location.

Conveyor transfer system 200 then continues to transfer batch 504 from first conveyor 224 to second conveyor 226 at the oven speed. During the transfer of batch 504 from first conveyor 224 to second conveyor 226, at block 422, processor 210 determines whether the transfer of batch 504 from the first conveyor 224 to second conveyor 226 is complete. To do so, processor 210 analyzes signals received from sensor 104, positioned at trailing end 272 of first conveyor 224. Thus, processor 210 is configured to determine whether the transfer of batch 504 from the first conveyor 224 to second conveyor 226 is complete based on an input from sensor 104.

Once processor 210 determines that batch 504 has completely transferred from first conveyor 224 to second conveyor 226 (as shown in FIG. 5 at T=3), processor 210 executes block 424. In some embodiments, method 400 proceeds to block 424 in response to determining that batch 504 has completely transferred from first conveyor 224 to second conveyor 226. At block 424, processor 210 increases the speed of first conveyor 224 to the press speed. Since batch 504 is no longer on first conveyor 224, processor 210 accelerates first conveyor 224 from the oven speed to the press speed in anticipation of a new batch, batch 506, being ready (as shown in FIG. 5 at T=4). New batch 506 will be transferred from press conveyor 122 to first conveyor 224 at the press speed once new batch 506 is ready. Whilst new batch 506 is being prepared and transferred, second conveyor 226 continues transferring first batch 504 to oven conveyor 328 (as shown in FIG. 5 at T=4).

Alternatively, the time needed to complete the transfer from first conveyor 224 to second conveyor 226 may be programmed into memory 214. Thus, to determine when a batch is expected to be completely transferred from first conveyor 224 to second conveyor 226, processor 210 may start a countdown timer based on the time needed to complete the transfer. Thus, processor 210 may be configured to accelerate first conveyor 224 from the oven speed to the press speed based on a countdown timer.

At block 428, while second conveyor 226 continues transferring first batch 504 to oven conveyor 328, processor 210 determines whether new batch 506 is ready by monitoring for a signal either from sensor 102 positioned at trailing end 172 of press conveyor 122 or from press controller 112 indicating that new batch 506 is ready. Thus, processor 210 is configured to determine whether new batch 506 is ready based on an input from sensor 102.

Press 100 prepares new batch 506 by pressing balls of dough to flatten the balls. Once processor 210 determines that new batch 506 is ready (as shown in FIG. 5 at T=4), processor 210 executes block 430. In some embodiments, method 400 proceeds to block 430 in response to determining that new batch 506 is ready. At block 430, processor 210 sets press conveyor 122 to the press speed. By doing so, press conveyor 122 starts transferring new batch 506 to first conveyor 224. Accordingly, immediately after new batch 506 is ready (or shortly thereafter), new batch 506 is transferred from press conveyor 122, at the press speed, to press conveyor 122. Since new batch 506 is transferred at the press speed, instead of the oven speed, the total time needed to transfer new batch 506 to oven conveyor 328 is reduced.

Alternatively, the time needed for new batch 506 to be ready may be programmed into memory 214. Thus, to determine when a new batch is expected to be ready, processor 210 may start a countdown timer based on the time needed to prepare the new batch. Thus, processor 210 may be configured to set press conveyor 122 to the press speed to transfer new batch 504 to first conveyor 224 based on a countdown timer.

Operation of method 400 then returns to block 410, where new batch 506 is transferred to first conveyor 224, and the process repeats itself until a stop signal is received (not shown).

As shown in FIG. 5 at T=4, batch 504 is transferred, from press conveyor 122 to first conveyor 224, then to second conveyor 226, before a new batch 506 is ready at press conveyor 122. As shown, batch 504 is completely transferred to second conveyor 226 at T=3, but new batch 506 is not ready until a later time, T=4.

The timing may be chosen such as to minimize idle time of press 100 and first conveyor 224. If the time taken to transfer batch 504 from press conveyor 122 to second conveyor 226 is longer than one press cycle, then press 100 will remain idle for some time before new batch 506 can be transferred to first conveyor 224. On the other hand, if the time taken to transfer batch 504 from press conveyor 122 to second conveyor 226 is shorter than one press cycle, then first conveyor 224 will remain idle until new batch 506 is ready, and oven conveyor 328 may be overloaded (as it operates at the slower oven speed). Accordingly, to minimize idle time of press 100 and first conveyor 224, the time taken to transfer batch 504 from press conveyor 122 to second conveyor 226 (i.e. from T=1 to T=3) is ideally substantially equal to the time taken by press 100 to complete one press cycle (i.e. from T=1 to T=4).

To achieve the desired timing, the intermediate speed and the pre-determined position (i.e. position of sensor 106) are selected based on the time of the press cycle and the time needed to transfer batch 504 from press conveyor 122 to second conveyor 226. The time needed to transfer batch 504 from press conveyor 122 to second conveyor 226 will depend on the distance travelled by batch 504 (on first conveyor 224 and on second conveyor 226) at each of the press speed, the intermediate speed, and the oven speed. As shown in FIG. 5, batch 504 travels a distance of $d_{press}$ at press speed (the length of batch 504), a distance of dint at intermediate speed, and a distance of doyen at oven speed.

In one embodiment, the press cycle is approximately 3 seconds. Further, in the same embodiment, sensor 106 is positioned 10 inches from infeed end 274 of second conveyor 226. Further, in the same embodiment, $d_{press}$ is 40 inches, dint is 22 inches, and doyen is 30 inches. Further, in the same embodiment press speed is 54 inches per second, intermediate speed is 40 inches per second, and oven speed is 20 inches per second. Accordingly, in said embodiment, batch 504 travels at $d_{press}$ in about 0.75 seconds (i.e. as shown in FIG. 5 from T=0 to T=1). Batch 504 then travels at dint for about 0.55 seconds until leading edge of batch 504 reaches sensor 106 (i.e. as shown in FIG. 5 from T=1 to T=2). Batch 504 then travels at dint for about 1.50 seconds until batch 504 is transferred from first conveyor 224 to second conveyor 226 (i.e. as shown in FIG. 5 from T=2 to T=3). Accordingly, batch 504 is transferred from press conveyor 122 to second conveyor 226 in approximately 2.8 seconds, which is less than the press cycle of 3 seconds.

Figure 6:
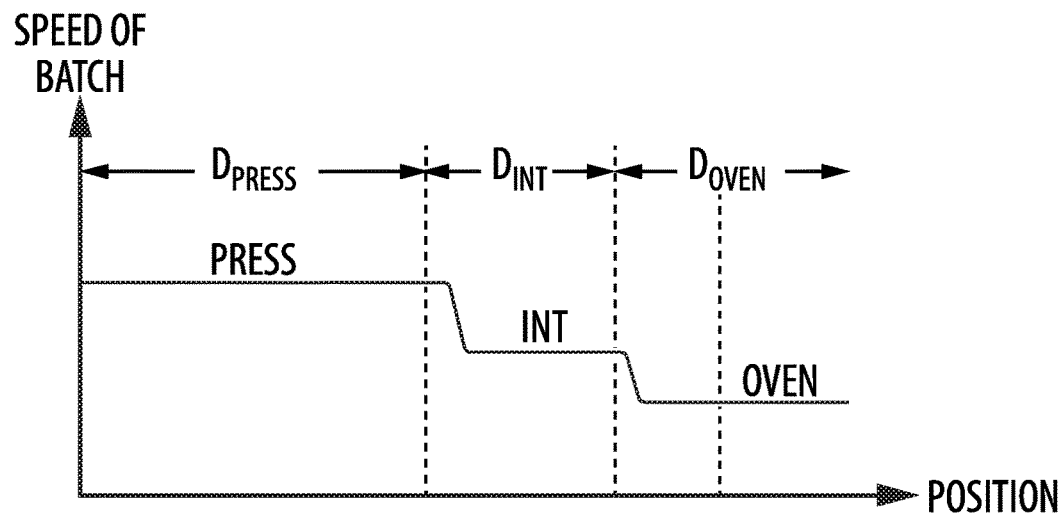
FIG. 6 is a graph illustrating the speed of a batch of product along the conveyor transfer system of FIG. 1.

Further, in selecting the intermediate speed and the position of sensor 106, the time needed to decelerate from press speed to intermediate speed and from intermediate speed to oven speed should be considered. FIG. 6 is a graph illustrating the speed of batch 504 along transfer conveyor system 200. As shown, batch 504 travels substantially at press speed, intermediate speed, and oven speed; but also for some period of time at a speed dependent on the deceleration of batch 504.

Returning to FIG. 4, concurrent to the operation of block 410, at block 440, processor 210 monitors the transfer of first batch 504 to oven conveyor 328. As shown in FIG. 5 at T=4 and T=5, while new batch 506 is being transferred to first conveyor 224, first batch 504 may remain on any of second conveyor 226 and oven conveyor 328. Accordingly, at block 440, processor 210 determines whether the transfer of first batch 504 from the second conveyor 226 to oven conveyor 328 is complete. To do so, processor 210 analyzes signals received from sensor 108, positioned at trailing end 276 of second conveyor 226. Thus, processor 210 is configured to determine whether the transfer of first batch 504 from the second conveyor 226 to oven conveyor 328 is complete based on an input from sensor 108.

Once processor 210 determines that first batch 504 has completely transferred from second conveyor 226 to oven conveyor 328 (as shown in FIG. 5 at T=5), first batch 504 will travel through baking chamber 310 on oven conveyor 226 and method 400 proceeds to block 442. In some embodiments, method 400 proceeds to block 442 in response to determining that first batch 504 has completely transferred from second conveyor 226 to oven conveyor 328. At block 442, processor 210 increases the speed of second conveyor 226 to the intermediate speed. Since first batch 504 is no longer on second conveyor 226, processor 210 accelerates first conveyor 224 from the oven speed to the intermediate speed in anticipation of a batch 506 being transferred from first conveyor 224 to second conveyor 226 (as shown in FIG. 5 at T=2).

Alternatively, the time needed to complete the transfer from second conveyor 226 to oven conveyor 328 may be programmed into memory 214. Thus, to determine when a batch is expected to be completely transferred from second conveyor 226 to oven conveyor 328, processor 210 may start a countdown timer based on the time needed to complete the transfer. Thus, processor 210 may be configured to increase the speed of second conveyor 226 to the intermediate speed based on a countdown timer.

Of course, the above described embodiments are intended to be illustrative only and in no way limiting. The described embodiments are susceptible to many modifications of form, arrangement of parts, details and order of operation. For example, software (or components thereof) implemented in the modules described above could be implemented using more or fewer modules. The disclosure is intended to encompass all such modification within its scope, as defined by the claims.

The invention claimed is:

1. A tortilla conveyor transfer system configured to transfer product from a tortilla press to an oven, the tortilla press outputting batches of product to a press conveyor driven at a press speed, and the oven receiving the batches of product at an oven conveyor driven at an oven speed, the oven speed being slower than the press speed, the tortilla conveyor transfer system comprising:
a first variable speed conveyor positioned in series with the press conveyor;
a second variable speed conveyor positioned in series with the first variable speed conveyor and the oven conveyor; and
a controller communicatively coupled to the first variable speed conveyor and to the second variable speed conveyor, and configured to while the press conveyor is at the press speed, operate the first variable speed conveyor at the press speed, thereby transferring a batch of product from the press conveyor to the first variable speed conveyor;
operate the second variable speed conveyor at an intermediate speed, the intermediate speed being faster than the oven speed and slower than the press speed;
once the batch of product has completely transferred from the press conveyor to the first variable speed conveyor, reduce the speed of the first variable speed conveyor to the intermediate speed; and
reduce the speed of the first variable speed conveyor to the oven speed and reduce the speed of the second variable speed conveyor to the oven speed, to transfer the batch of product from the first variable speed conveyor to the second variable speed conveyor, and then from the second variable speed conveyor to the oven conveyor.

2. The tortilla conveyor transfer system of claim 1, wherein the controller is further configured to increase the speed of the first variable speed conveyor to the press speed once the batch of product has completely transferred from the first variable speed conveyor to the second variable speed conveyor.

3. The tortilla conveyor transfer system of claim 1, wherein the controller is further configured to increase the speed of the second variable speed conveyor to the intermediate speed once the batch of product has completely transferred from the second variable speed conveyor to the oven conveyor.

4. The tortilla conveyor transfer system of claim 1, wherein the controller is further configured to reduce the speed of the first variable speed conveyor to the oven speed and to reduce the speed of the second variable speed conveyor to the oven speed synchronously.

5. The tortilla conveyor transfer system of claim 1, further comprising a first sensor positioned at a trailing end of the press conveyor, and wherein the first sensor is configured to detect whether the batch of product has completely transferred from the press conveyor to the first variable speed conveyor, and wherein the controller is configured to determine whether the batch of product has completely transferred from the press conveyor to the first variable speed conveyor based on a first input from the first sensor.

6. The tortilla conveyor transfer system of claim 5, further comprising a second sensor positioned at a trailing end of the first variable speed conveyor, and wherein the second sensor is configured to detect whether the batch of product has completely transferred from the first variable speed conveyor to the second variable speed conveyor, and wherein the controller is configured to determine whether the batch of product has completely transferred from the first variable speed conveyor to the second variable speed conveyor based on a second input from the second sensor.

7. The tortilla conveyor transfer system of claim 6, further comprising a third sensor positioned at a trailing end of the second variable speed conveyor, and wherein the third sensor is configured to detect whether the batch of product has completely transferred from the second variable speed conveyor to the oven conveyor, and wherein the controller is configured to determine whether the batch of product as completely transferred from the second variable speed conveyor to the oven conveyor based on a third input from the third sensor.

8. The tortilla conveyor transfer system of claim 7, further comprising a fourth sensor positioned at the pre-determined location, and wherein the fourth sensor is configured to detect whether the batch of product has reached the pre-determined location, and wherein the controller is configured to determine whether the batch of product has reached the pre-determined location based on a fourth input from the fourth sensor.

9. The tortilla conveyor transfer system of claim 1, wherein the controller is configured to reduce the speed of the first variable speed conveyor to the intermediate speed based on a first countdown timer.

10. The tortilla conveyor transfer system of claim 9, wherein the controller is configured to increase the speed of the first variable speed conveyor to the press speed based on an input from a second countdown timer.

11. The tortilla conveyor transfer system of claim 10, wherein the controller is configured to increase the speed of the second variable speed conveyor to the intermediate speed based on a third countdown timer.

12. The tortilla conveyor transfer system of claim 1, wherein the controller is further configured to reduce the speed of the first variable speed conveyor to the oven speed and to reduce the speed of the second variable speed conveyor to the oven speed once the batch reaches a pre-determined location along the second variable speed conveyor.

13. The tortilla conveyor transfer system of claim 12, wherein the controller is configured to reduce the speed of the first variable speed conveyor to the oven speed and to reduce the speed of the second variable speed conveyor to the oven speed based on a fourth countdown timer.

14. The tortilla conveyor transfer system of claim 1, further comprising a press that move in a vertical direction toward the press conveyor so as to press the batch of product.

15. The tortilla conveyor transfer system of claim 14, further comprising an oven that receives the batch of product from the oven conveyor.

16. The tortilla conveyor transfer system of claim 1, further comprising an oven that receives the batch of product from the oven conveyor.

17. A method for transferring product from a tortilla press to an oven, the tortilla press outputting batches of product to a press conveyor driven at a press speed, and the oven receiving the batches of product at an oven conveyor driven at an oven speed, the oven speed being slower than the press speed, the method comprising:
while the press conveyor is at the press speed, operating a first variable speed conveyor positioned in series with the press conveyor at the press speed, thereby transferring a batch of product from the press conveyor to the first variable speed conveyor;

operating a second variable speed conveyor positioned in series with the first variable speed conveyor and the oven conveyor at an intermediate speed, the intermediate speed being faster than the oven speed and slower than the press speed;

once the batch of product has completely transferred from the press conveyor to the first variable speed conveyor, reducing the speed of the first variable speed conveyor to the intermediate speed; and reducing the speed of the first variable speed conveyor to the oven speed and reducing the speed of the second variable speed conveyor to the oven speed, to transfer the batch of product from the first variable speed conveyor to the second variable speed conveyor, and then from the second variable speed conveyor to the oven conveyor.

18. The method of claim 17, further comprising: determining, based on a sensor input from a sensor positioned at a pre-determined location along the second variable speed conveyor, that the batch of product has reached the pre-determined location; and in response to determining that the batch of product has reached the pre-determined location, reducing the speed of the first variable speed conveyor to the oven speed and reducing the speed of the second variable speed conveyor to the oven speed.

19. The method of claim 17, further comprising reducing the speed of the first variable speed conveyor to the oven speed and reducing the speed of the second variable speed conveyor to the oven speed based on a countdown timer.

20. The method of claim 17, further comprising reducing the speed of the first variable speed conveyor to the oven speed and reducing the speed of the second variable speed conveyor to the oven speed synchronously.

21. The method of claim 17, further comprising: determining, based on a sensor input, that the batch of product has completely transferred from the press speed conveyor to the first variable speed conveyor; and in response to determining that the batch of product has completely transferred from the press speed conveyor to the first variable speed conveyor, reducing the speed of the first variable speed conveyor to the intermediate speed.

22. The method of claim 17, further comprising: determining, based on a sensor input, that the batch of product has completely transferred from the first variable speed conveyor to the second variable speed conveyor; and in response to determining that the batch of product has completely transferred from the first variable speed conveyor to the second variable speed conveyor, increasing the speed of the first variable speed conveyor to the press speed.

23. The method of claim 17, further comprising: determining, based a sensor input, that the batch of product has completely transferred from the second variable speed conveyor to the oven conveyor; and in response to determining that the batch of product has completely transferred from the second variable speed conveyor to the oven conveyor, increasing the speed of the second variable speed conveyor to the intermediate speed.

24. The method of claim 17, further comprising pressing the batch of product and feeding the pressed batch of product to the press conveyor.

25. The method of claim 17, further comprising directing the batch of product on the oven conveyor to an oven.

26. The method of claim 25, further comprising pressing the batch of product and feeding the pressed batch of product to the press conveyor.

\* \* \* \* \*